(12) United States Patent
Vitner et al.

(10) Patent No.: US 7,700,057 B2
(45) Date of Patent: Apr. 20, 2010

(54) PROCESS FOR THE PRODUCTION OF TITANIUM PRODUCTS

(75) Inventors: Asher Vitner, Jerusalem (IL); Aharon Eyal, Jerusalem (IL); Revital Mali, Jerusalem (IL)

(73) Assignees: Joma International AS, Limingen (NO); Asher Vitner Ltd., Jerusalem (IL)

( * ) Notice: Subject to any disclaimer, the term of this patent is extended or adjusted under 35 U.S.C. 154(b) by 0 days.

(21) Appl. No.: 12/083,362

(22) PCT Filed: Oct. 15, 2006

(86) PCT No.: PCT/IL2006/001185

§ 371 (c)(1),
(2), (4) Date: Apr. 10, 2008

(87) PCT Pub. No.: WO2007/043055

PCT Pub. Date: Apr. 19, 2007

(65) Prior Publication Data

US 2009/0158895 A1    Jun. 25, 2009

(30) Foreign Application Priority Data

Oct. 11, 2005  (IL) ...................................... 171363
Oct. 11, 2005  (IL) ...................................... 171364
Oct. 5, 2006   (IL) ...................................... 178477

(51) Int. Cl.
*C01G 23/00*   (2006.01)
*C01G 23/047*  (2006.01)
*C01G 23/053*  (2006.01)

(52) U.S. Cl. ........................... 423/71; 423/84; 423/610; 423/615; 423/616

(58) Field of Classification Search .................. 423/71, 423/84, 616, 615, 610
See application file for complete search history.

(56) References Cited

U.S. PATENT DOCUMENTS

| 1,357,690 | A  | * | 11/1920 | Coffelt ........................ 423/71 |
| 2,098,056 | A  | * | 11/1937 | Mcberty ..................... 423/154 |
| 2,345,980 | A  | * | 4/1944  | Lewis-Keats ............... 423/616 |
| 2,521,392 | A  | * | 9/1950  | Merker et al. ............... 423/615 |
| 7,008,602 | B2 | * | 3/2006  | Smith et al. .................. 423/82 |
| 2004/0136899 | A1 | * | 7/2004 | Bekker et al. ............... 423/610 |

* cited by examiner

*Primary Examiner*—Jerry Lorengo
*Assistant Examiner*—Jared Wood
(74) *Attorney, Agent, or Firm*—The Nath Law Group (57) ABSTRACT

The invention provides a method for the Industrial purification of a titanium feed stream of purity P1, by the formation of a titanium-double-salt precipitate of purity P2 and a titanium solution with purity P3, wherein P2>P1>P3, the method comprising the steps of: i. forming, from the feed, a medium comprising water, titanium ion, a cation selected from the group consisting of ammonium, cations of alkali metals, protons and a combination thereof, and an anion selected from the group consisting of OH, SO4, HSO4, halides and a combination thereof, which formed medium is further characterized by the presence of (a) a double-salt precipitate comprising titanium ion, at least one of the cations and at least one of the anions; and (b) a titanium solution; and wherein the concentration of the anion in the titanium solution is higher than 15% and the ratio between the concentrations of the cation and the anion in the titanium solution is higher than 0.2 and lower than 1.6; and ii. separating at least a portion of the precipitate from the solution.

49 Claims, 3 Drawing Sheets

PROCESS FOR THE PRODUCTION OF TITANIUM PRODUCTS

The present invention relates to a method for the production of titanium products. More particularly the present invention relates to a method for the production of titanium products from a low-grade-stream solution of titanium.

The industrial production of titanium usually includes a chlorination or sulfonation stage, wherein titanium-ores of high-grade are used. In the chlorination process; $HCl/Cl_2$ are used to extract titanium from ores and titanium chloride is distilled; thus, a highly purified titanium is produced. However, the main disadvantage of this process is the high-cost of the titanium-chloride distillation and purification.

Titanium dioxide is widely used as a white pigment with a market of about $7 million per year.

Titanium oxide being a white pigment is usually produced from high-grade titanium ores. The product has to meet strict standards of content of impurities, particle size and distribution of particle-size. The particle size of the titanium oxide particles ranges from several nanometers to several hundreds of nanometers. The cost of the raw material for the production of these products is high.

The process described in the present disclosure enables producing titanium oxide from low-grade titanium stream using a purification stage in which a titanium double salt is produced.

Titanium metal is produced from high-grade titanium ores. The product has to meet strict standards of content of impurities. The cost of the raw material for the production of this product is high. Low-grade titanium ores or low grade solution streams obtained from industrial processes are not used for the production of these products.

The process described in the present disclosure suggests producing titanium products from low-grade titanium stream using a purification stage in which a titanium double salt is produced.

A double salt is defined as a crystal that consists of two different cations and/or anions. Usually it is characterized by a significant lower solubility compared to the simple salts of its components.

Goroshchenko, Ya. G (Double titanium and ammonium sulfates) Doklady Akademii Nauk SSSR (1956), 109 532-4 have studied the precipitation of Ti(iv) double salt from pure solutions and found that a salting out effect is observed at high ammonium sulfate or H2SO4 concentrations and the solubility of the double salt is reduced.

Patent BR 20012509 authored by SILVA HELIO JOSE in 2003 separates titanium oxide from the other polyvalent cations present in ilmenite or other titanium containing ores. In this proposed process, Fe and Al are separated from the titanium salt prior to the precipitation of Fe(III) in the form of ammonium double salt. The addition of ammonium sulfate to a solution obtained by leaching ilmenite with sulfuric acid, induced the precipitation of the binary salts $(NH_4)Fe(SO_4)_2$ $12H_2O$, $(NH_4)_2TiO(SO_4)_2H_2O$, and $(NH_4)_2Fe(SO_4)_2 6H_2O$ together.

Double salts can be produced from a large number of polyvalent cations. Both titanium, Fe(III) and Fe(II) produce double salts; and those double salts usually precipitate together.

Said patent and articles teach that double salts of polyvalent cations are easily precipitated but tend to co-precipitate to form a product of low purity. Precipitation of the salt at low temperatures may decrease the solubility of the double salts thus increasing the precipitation yield of titanium double salt but is expected to decrease the purity of the product. The result is that there is no industrial method for the purification of titanium salts using the double salt technology.

According to the present invention, it was surprisingly found that a titanium double salt can be precipitated from a solution containing a high proportion of polyvalent cation and especially Fe(II) and Fe(III) at high yield and high selectivity, to produce a product of a high titanium to polyvalent cations ratio.

It was surprisingly found that with mother liquor in which the anion concentration is higher than 20% and in which the monovalent cation to anion ratio is between 0.2 to 1.4, the crystallization yield is very high while the purity of the double salt is very high. It was also surprisingly found that the produced double salt can be washed with very low losses of titanium, to provide a product of a grade sufficient for the production of titanium metal, raw material for titanium metal and other metal products of high purity and of titanium oxides and titanium salts. This high purity is obtained despite the fact that both Fe(III) and Fe(II) are present in large quantities in the solution and are able to form similar double salts. At higher monovalent cation to anion ratio the iron double salt co-precipitates with the titanium double salt thus reducing the purity of the product.

The present invention provides a highly efficient, low-cost purification method, in which low-grade titanium streams are consumed for the production of high-grade titanium, raw materials for the production of high-grade titanium dioxide, high grade titanium metal and other titanium products such as titanyl chloride, titanyl sulfate and other titanium salts.

DISCLOSURE OF THE INVENTION

With this state of the art in mind, there is now provided, according to the present invention, a method for the industrial purification of a low-grade titanium feed stream of purity P1, by the formation of a titanium-double-salt precipitate of purity P2 and a titanium solution with purity P3, wherein P2>P1>P3, said method comprising the steps of:

i. forming, from said feed, a medium comprising water, titanium ion, a cation selected from the group consisting of ammonium, cations of alkali metals, protons and a combination thereof, and an anion selected from the group consisting of OH, $SO_4$, $HSO_4$, halides and a combination thereof, which formed medium is further characterized by the presence of (a) a double-salt precipitate comprising titanium ion, at least one of said cations and at least one of said anions; and (b) a titanium solution; and wherein the concentration of said anion in said titanium solution is higher than 15% and the ratio between the concentrations of said cation to said anion in said titanium solution is higher than 0.2 and lower than 1.6; and ii. separating at least a portion of said precipitate from said solution.

The term titanium-double-salt as used in the present specification refers to a crystal that consists of an anion and two different cations wherein one of said cations is titanium.

The term cation as used in the present specification refers to the monovalent cation present in the double salt.

The term anion as used in the present specification refers to the anion present in the double salt.

The term purity or P will be defined as the weight ratio between the titanium to total polyvalent metals, wherein the purity is presented in several cases in terms of percentage, for example, P1 as used in the present specification refers to the purity of titanium feed solution and P2 refers to the purity of the titanium double salt and P3 refers to the purity of the titanium solution (which is the mother liquor formed in the production of the titanium double salt).

The term titanium metal used in the present specification will be referred to in the present disclosure as elementary titanium such as in Titanium sponge or any other titanium metallic product.

The term titanium products used in the present specification refers to various products containing titanium such as titanium hydroxide, titanium oxy hydroxide, titanium chloride, titanium oxy chloride, titanium sulfate, titanium oxysulfate and other titanium organic or inorganic salts According to one embodiment of the present invention, said titanium feed might be a low-grade-stream solution of titanium that is formed by leaching titanium ores using an acid solution. According to another embodiment said titanium feed comprises an acid selected from the group consisting of acid halides, sulfuric acid, nitric acid or any combination thereof.

According to another embodiment of the present invention, said feed solution comprises a waste stream from industrial processes and in another embodiment said titanium feed comprises a waste stream from a titanium production process.

The present invention thus provides a highly efficient process for the purification of a titanium feed stream and especially from low-grade titanium streams.

According to another embodiment, the present invention further comprises the step of processing said precipitate to produce titanium oxide.

Among the titanium oxide products are anatase, rutile and brookite.

According to another embodiment, the present invention further comprises the step of processing said precipitate to produce titanium products other than titanium oxide.

Among the products are $Ti(OH)_4$, $TiOCl_2$, $TiOCl_2$, $TiCl_4$, $TiOSO_4$, $TiO(NO_3)_2$, other titanium inorganic salts, and titanium organic salts.

In other preferred embodiments of the present invention there is provided a process comprising the further step of processing said precipitate to produce titanium metal.

In preferred embodiments of the present invention said titanium feed stream is an aqueous waste solution.

In preferred embodiments of the present invention said titanium feed is formed by leaching titanium ores using an acid solution.

In one embodiment, the purity of said titanium feed P1, is in the range of between about 10% and about 90%. Preferably P1 is lower than 60%. In especially preferred embodiments P1 is lower than 50% and in another preferred embodiment P1 is lower than 45%.

According to one embodiment, said titanium feed includes iron with a Fe/Ti ratio of at least 0.25 and the titanium double salt precipitate contains a Fe/Ti ratio of less than 0.02.

In preferred embodiments of the present invention P1 is less than 70% and P2 is greater than 95%.

In especially preferred embodiments of the present invention said titanium feed stream comprises protons and at least one anion selected from the group consisting of halides, sulfate, nitrate and a combination thereof.

In preferred embodiments of the present invention said titanium feed stream comprises a waste stream from an industrial process.

In some preferred embodiments of the present said titanium feed stream includes iron and the molar ratio between the iron and titanium in said low-grade stream is in a range of between about 0.2:1 and about 3:1.

In said preferred embodiments, preferably the molar ratio between titanium and iron in said double salt is greater than the ratio in said feed stream by a factor of at least 5.

In some preferred embodiments of the present said cation in said double-salt is ammonium.

In other preferred embodiments of the present invention the cation in said double-salt is selected from the group consisting of sodium and potassium.

In some preferred embodiments of the present the anion in said double-salt is selected from the group consisting OH, $SO_4$ $HSO_4$ and halides.

In preferred embodiments of the present said precipitate is selected from the group consisting of titanium double salts and titanium basic double salts.

Preferably said precipitate contains at least 80% of the titanium originally present in said low-grade-stream solution.

In preferred embodiments of the present invention the ratio P2/P3 is greater than 2.

In a more preferred embodiment of the present invention the precipitate contains more than 85% of the titanium present in the titanium feed and the ratio between the polyvalent impurities, i.e. (1-P3)/(1-P2) is greater than 10.

In especially preferred embodiments of the present the ratio P2/P3 is greater than 10.

In preferred embodiments of the present the temperature of said formed medium is in the range between 0-80° C.

In especially preferred embodiments of the present the temperature in which said contact is conducted is in the range of 10-50° C.

In a most preferred embodiment of the present the temperature in which said contact is conducted is in the range of 20-40° C.

In preferred embodiments of the present invention said titanium solution is modified to form products selected from the group consisting of iron metal, iron oxide and products of other polyvalent cations present in said titanium feed solution, wherein one of the modification stages is crystallization.

In said preferred embodiments, preferably said iron containing product is selected from the group of iron double salt, iron oxide and iron hydroxide.

In said preferred embodiments preferably the anion of said double iron salt is selected from the group consisting of monovalent anions, divalent anions, halide anions, sulfate and bisulfate anions and a combination thereof.

In said preferred embodiments, preferably the second cation of said double iron salt is selected from the group consisting of ammonium, sodium and potassium.

In said preferred embodiments, preferably said compound of polyvalent cation is selected from the group consisting of neutral double salts, basic double salt, metal oxides and a metal hydroxide of said polyvalent cation.

In some preferred embodiments of the present invention said method further includes a precipitate washing stage with a solution to form a purified washed precipitate with a purity P4 and a wash solution with a purity of P5, wherein P4>P2>P5.

According to a preferred embodiment said washing solution comprises the same anion and cation present in the titanium double salt, wherein the cation is selected from the group consisting of ammonium, alkali metals and a combination thereof, and the anion is selected from the group consisting of $SO_4$, $HSO_4$ and halides and a combination thereof, and wherein the concentration of said anion is higher then 15% and the ratio between the concentrations of said cation to said anion in said titanium solution is higher than 0.2 and lower than 1.6.

In said preferred embodiments, preferably said washing is with a solution comprising protons, ammonium and sulfate ions.

In said preferred embodiment, the purity of the washed precipitate is higher than 99%.

In other preferred embodiments of the present invention said method further comprises the step of recrystallizing said precipitate, optionally pre-washed, to form a precipitate with a purity of P6 and a mother liquor with a purity P7, wherein P6>P2>P7.

In said preferred embodiment, the purity of the recrystallized precipitate is higher than 99% and more preferably is higher than 99.9%.

Preferably, said crystallization is induced by an action selected from the group consisting of addition of a monovalent-cation-salt, addition of a monovalent-cation-base, increasing temperature, dilution and a combination thereof.

Preferably said re-crystallization uses a solution comprising at least one cation and at least one anion selected from the groups thereof mentioned hereinbefore.

In some preferred embodiments of the present invention, for the production of a titanium oxide from said titanium double-salt solution via precipitation of titanium oxide, the method comprises the steps of:
a. dissolution of a titanium double-salt in aqueous solution; and
b. inducing a change of the conditions to precipitate titanium oxide from said solution, wherein said change is selected from the group consisting of dilution, temperature elevation, increasing pH and a combination thereof.

In said preferred embodiment, preferably the weight ratio between the amount of titanium in said titanium oxide and that in said titanium double-salt is greater than 0.8.

In said preferred embodiments, said temperature elevation refers to increasing the temperature to be above 80° C.

Preferably the purity of said titanium-double-salt (P2) is greater than 80%.

In especially preferred embodiments of the present invention the purity of said titanium-double-salt (P2) is greater than 85%.

In a most preferred embodiment of the present the purity of said titanium-double-salt (P2) is greater than 95%.

In other preferred embodiments of the present the process of said processing said precipitate includes a production stage of titanium oxide, said method comprising the steps of:
a. dissolution of a titanium double-salt in aqueous solution; and
b. inducing a change of the conditions to form a titanium hydroxide precipitation from said solution, wherein said change is selected from the group consisting of dilution, temperature elevation, increasing pH and a combination thereof.
c. Transformation of the titanic acid to titanium oxide In said preferred embodiment, preferably said titanium oxide contains at least 70% of the titanium that was present in said titanium feed.

Preferably, the titanium oxide is in the form of nano-particles in the medium range of 5-100 nanometer.

In a preferred embodiment of the present invention the titanium oxide is in the form of nano-particles in the medium range of 100-300 nanometer.

According to a preferred embodiment of the present invention the titanium feed is comprising of, among other polyvalent cations also Fe.

According to some preferred embodiments, the residual concentration of ammonium sulfate is above 20% and the residual $NH_4/SO_4$ ratio in the titanium solution is in the range of 0.2:1 to 3.1:1 and more preferred in the range of between 0.2:1 and 1.4:1. and most preferred in the range of 0.2:1 to 0.7:1.

Preferably the formed precipitate is selected from the group consisting of titanium double salts and titanium basic double salts. Especially preferred are embodiments wherein said precipitate contains at least 80% of the titanium that was present in said titanium feed, and most preferably at least 85%.

In a preferred embodiment the titanium feed contains a Fe/Ti ratio of at least 0.25 and the titanium double salt precipitate contains Fe/Ti ratio of less than 0.04 and more preferably of less than 0.02.

In a preferred embodiment P1 is less than 70% and P2 is greater than 95%.

Both Ti(iv), Fe(II) and Fe(III) form double salts and tend to co-precipitate together. Only at the final concentration of the second salt, present in the double salt, wherein the cation is ammonia or alkali and the anion is double salts anion.

In a titanium solution, that is higher than 10% and at second cation to anion ratio of between 0.1 to 1.6, the titanium double salt is precipitated at high purity. At ratios out of this range Fe(III) and especially Fe(II) co-precipitate with the Ti double salt. This specific condition enables the precipitation of the titanium double salt at high yield. The precipitation yield increases with increasing the residual second salt concentration and the purity is the highest in the narrow cation/anion ratio range of between 0.2 to 0.8.

Preferably the purity of the said precipitate, P2, is greater than 80%. In especially preferred embodiments the purity is greater than 90%. and in most preferred is a purity, P2, greater than 95%.

According to a preferred embodiment, the medium comprises sulfate ions wherein the molar ratio between the cation (ammonia or alkali metals) to $SO_4^=$ is greater than 0.1 and lower than 1.6. According to another preferred embodiment said molar ratio is greater than 0.2 and lower than 1.4, and according to another preferred embodiment, greater than 0.4 and lower than 0.8.

In a further preferred embodiment the titanium double salt is ammonium titanium sulfate and said third solution used for washing the precipitate comprises protons, ammonia and sulfate at an ammonia to $SO_4$ ratio of between 0.2 to 1.4. According to another preferred embodiment the solution also contains titanium.

Preferably said solution for dissolving said precipitate comprises a cation that is selected from the group consisting of ammonium and alkali metals and a combination thereof and an anion selected from the group consisting OH, $SO_4$, $HSO_4$, halides and acid halides and a combination thereof.

According to another preferred embodiment said solution comprises water.

In a preferred embodiment the final anion to cation ratio in the washing solution is between 0.2 to 1.4.

The precipitate can be dissolved in water or any other solution, and the salt containing the anion and cation present in the double salt, are added to create a final salt concentration higher than 10% and more preferred, higher than 20%, and most preferred, higher than 30%, and cation to anion ratios of between 0.2 to 1.4.

In especially preferred embodiments of the present invention, processing said precipitate includes a production stage of titanium chloride, comprising the steps of:
i. dissolution of a titanium double-salt and Cl salt in a solvent or minimal amount of water; and
ii. distillation of $TiCl_4$ from said solution.

In yet another preferred embodiment, the titanium double salt is contacted with a base at a temperature lower than that to precipitate titanic acid. The precipitate is washed and dissolved in acid.

In a preferred embodiment, the acid is HCl and the product is titanyl chloride. In another preferred embodiment the acid is $H_2SO_4$ and the product is titanyl sulfate, and in another preferred embodiment the acid is an organic acid or any inorganic acid.

In yet another preferred embodiment said titanium chloride contains at least 70% of the titanium that was present in said titanium feed solution, and more preferably at least 85%.

In addition, according to a first preferred embodiment, said titanium chloride or titanyl chloride are further used for the production of titanium metal.

According to another preferred embodiment the titanium metal is produced from any titanium salt that is produced and more preferably directly from the titanium double salt solution by reduction using the Kroll Process, with Na or Mg as reduction agents, or any other conventional reduction method.

According to a preferred embodiment, the product is elementary titanium such as titanium sponge or titanium ingot or any other elementary titanium product.

According to a preferred embodiment, said titanium solution, is modified by crystallization to form products selected from the group consisting of iron metal, iron oxide and products of other polyvalent cations present in said titanium feed.

According to another preferred embodiment said iron containing product is selected from the group consisting of a double iron salt, iron oxide and iron hydroxide.

According to a preferred embodiment the anion comprising said double iron salt is selected from the group consisting of monovalent anions, divalent anions, halide anions, sulfate and bisulfate anions and a combination thereof.

According to another preferred embodiment the second cation of said double-iron-salt is selected from the group consisting of ammonium, sodium and potassium.

According to a preferred embodiment, said second solution is modified by a crystallization stage to form products of other polyvalent cations present in said titanium feed selected from the group consisting of neutral double salts of their cation, basic double salts, metal oxides or metal hydroxides of their cation.

According to another preferred embodiment said crystallization stage is induced by a step selected from the group consisting of addition of a monovalent-cation-salt, addition of a monovalent-cation-base, increasing temperature, dilution and a combination thereof.

In yet another aspect of the present invention, there is now provided, a method for the production of a titanium metal from a titanium double-salt solution via reduction of titanium double salt, comprising the steps of:
  i. dissolution of a titanium double-salt in solution;
  ii. inducing reduction conditions to reduce the titanium in the double salt from said solution; and
  iii. further processing the elementary metal.

According to a preferred embodiment the ratio between the total titanium amount in said titanium metal or titanium chloride is greater than 0.8 of the initial amount of titanium and more preferably greater then 0.95.

According to a preferred embodiment said reduction methods refers to increasing the temperature to be above 80° C. In especially preferred embodiments said temperature elevation refers to increasing the temperature to be above 200° C. and most preferred is increasing the temperature to be above 250° C.

While the invention will now be described in connection with certain preferred embodiments in the following examples and with reference to the accompanying figures so that aspects thereof may be more fully understood and appreciate, it is not intended to limit the invention to these particular embodiments. On the contrary, it is intended to cover all alternatives, modifications and equivalents as may be included within the scope of the invention as defined by the appended Claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Figure 1:
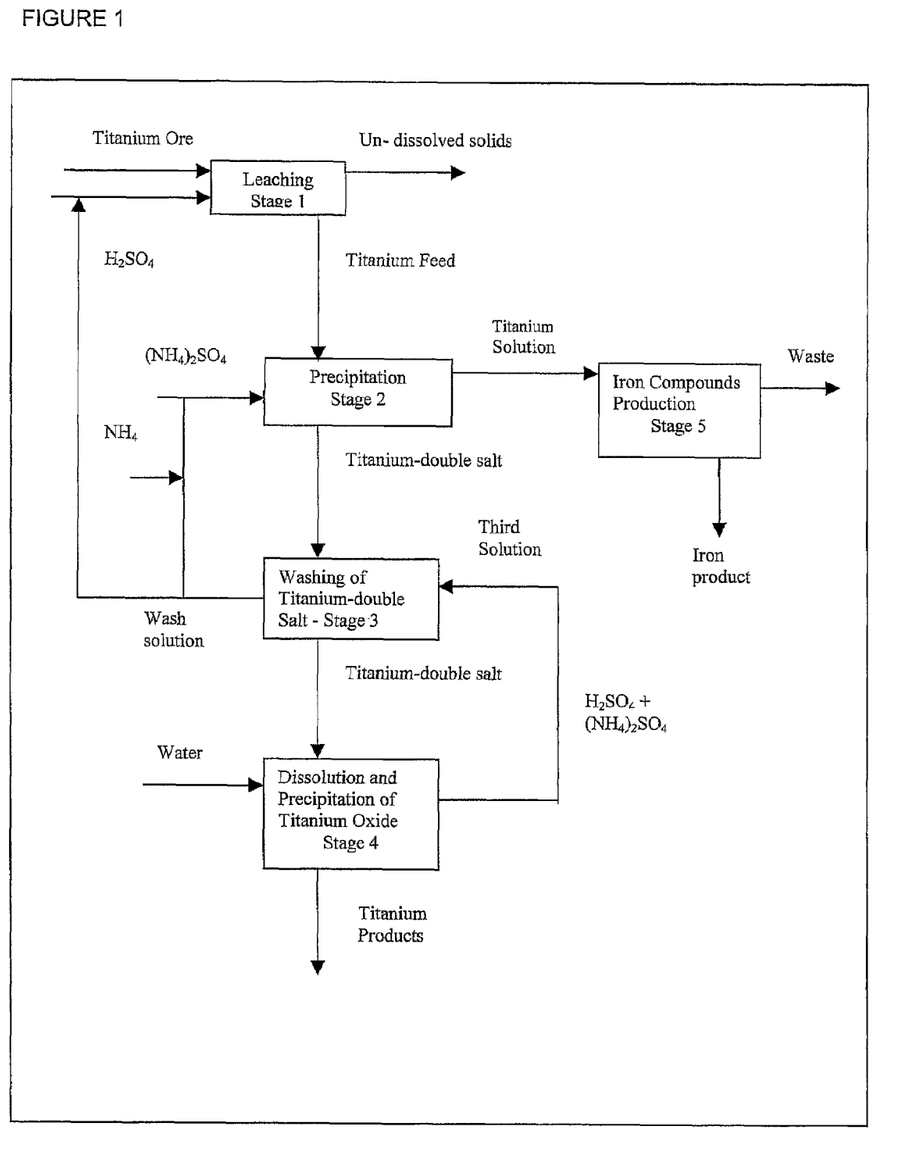
FIGS. 1-3 present flow diagrams of embodiments of the present invention.

FIG. 1 presents a flow diagram of one of the preferred processes according to the embodiments of the present invention. In Stage 1 titanium ores are leached using an acid solution to form a titanium feed solution of titanium salt, wherein the acid is selected from the group is consisting of acid halides, sulfuric acid, nitric acid or any combination thereof. For simplification, the acid in the present figure was chosen to be sulfuric acid. Two streams are exiting the leaching stage: a waste stream that contains undissolved solids and a stream defined as the titanium feed, which is entering Stage 2—the precipitation stage.

Alternatively to the method in which the titanium feed is formed at the leaching stage, in another preferred embodiment of the present invention, a waste stream from a titanium production process, or a waste stream from an iron production process is introduced at Stage 2 to the precipitation stage.

In Stage 2 (the precipitation stage) said medium is formed by mixing the titanium feed with a reagent selected from the group consisting of an anion and a monovalent cation, wherein the cation of the salt is selected from the group consisting of ammonium and alkali metals and a combination thereof, and the anion salt is selected from the group consisting of OH, $SO_4$, $HSO_4$, halides and a combination thereof, to form a titanium double-salt which precipitates and a mother liquor that is referred here as titanium solution.

For simplification, FIG. 1 demonstrates the addition of a solution containing $(NH_4)_2SO_4$ to Stage 2.

In a preferred embodiment this stage is conducted at a temperature range of 0-80° C., and in another preferred embodiment this stage is conducted at a temperature range of 10-50° C. and in yet another preferred embodiment, in the range of 20-40° C.

Two streams are exiting the Precipitation stage: the formed titanium double-salt, which precipitates, and titanium solution. The molar ratio between the ammonia and the $SO_4^=$ in the mother liquor is greater than 0.1. In another preferred embodiment it is greater than 0.2 and lower than 1.4 and in another preferred embodiment it is greater than 0.4 and lower than 0.8.

In the present figure the second cation in said titanium-double-salt is ammonium, while yet in another preferred embodiment it is selected from the group consisting of sodium, potassium or any alkaline metal.

This stage is very effective. In a preferred embodiment the said titanium-double-salt comprises at least 80% of the titanium that was presented in said titanium feed, and more preferably at least 85%.

In addition, this stage is characterized by the formation of a very pure titanium-double-salt wherein its purity (P2) is greater than 80%, preferably greater than 85%, more preferably greater then 90% and in the most preferred embodiment It is greater then 95%, wherein the ratio P2/P3 is greater than 2, more preferably greater than 5 and most preferably greater than 10.

Two streams are exiting the precipitation stage: the formed titanium double-salt, which precipitates, and a solution which is entering Stage 5.

At least a portion of the formed titanium double-salt which precipitates in Stage 2 is separating from said solution and enters Stage 3 for a washing stage. In this stage the double-salt is washed with a third solution to form a purified precipitate of titanium salt with titanium purity of P4 and a wash solution with a titanium purity of P5, wherein P4>P2>P5.

The third solution comprises the same cation and anion used in the precipitation stage (Stage 2). In a preferred embodiment, and as noted in the present Figure, this solution contains $NH_4HSO_4$ and $H_2SO_4$, wherein in a more specific preferred embodiment the $SO_4/HSO_4$ molar ratio in said solution is smaller then 2.

FIG. 1 shows that said third solution is a recycled stream exiting from Stage 4. In addition this figure shows that said wash solution is exiting the washing stage and a portion of it is recycling back to Stage 2 with the addition of $NH_4OH$ and another portion of it is recycling back to the leaching stage, Stage 1, with the addition of $H_2SO_4$.

The titanium double-salt precipitate is then entered into the dissolution and re-precipitation stages (Stage 4) to form purified titanium salt precipitate with a titanium purity of P6 and a second wash solution with a titanium purity P7, wherein P6>P2>P7.

In a preferred embodiment the solution in this stage comprises the same cation and anion used in Stage 2. According to another embodiment said solution comprises $NH_4HSO_4$ and $H_2SO_4$ which is recycled back to Stage 3. According to another embodiment and as described in FIG. 1, said solution is water.

In a preferred embodiment the recrystallization stage is induced by a step selected from the group consisting of dilution, heating, increasing pH or a combination thereof. The titanium product exiting the recrystallization stage contains at least 70% of the titanium that was present in said low-grade-source solution, more preferably at least 85%. In another preferred embodiment the titanium product is titanium chloride or titanyl chloride of a purity sufficient to produce titanium metal.

In a preferred embodiment the said second solution exiting Stage 2 is modified to form products selected from the group consisting of iron metal, iron oxide and products of other polyvalent cation presented in the low-grade-source of titanium feed.

Figure 2:
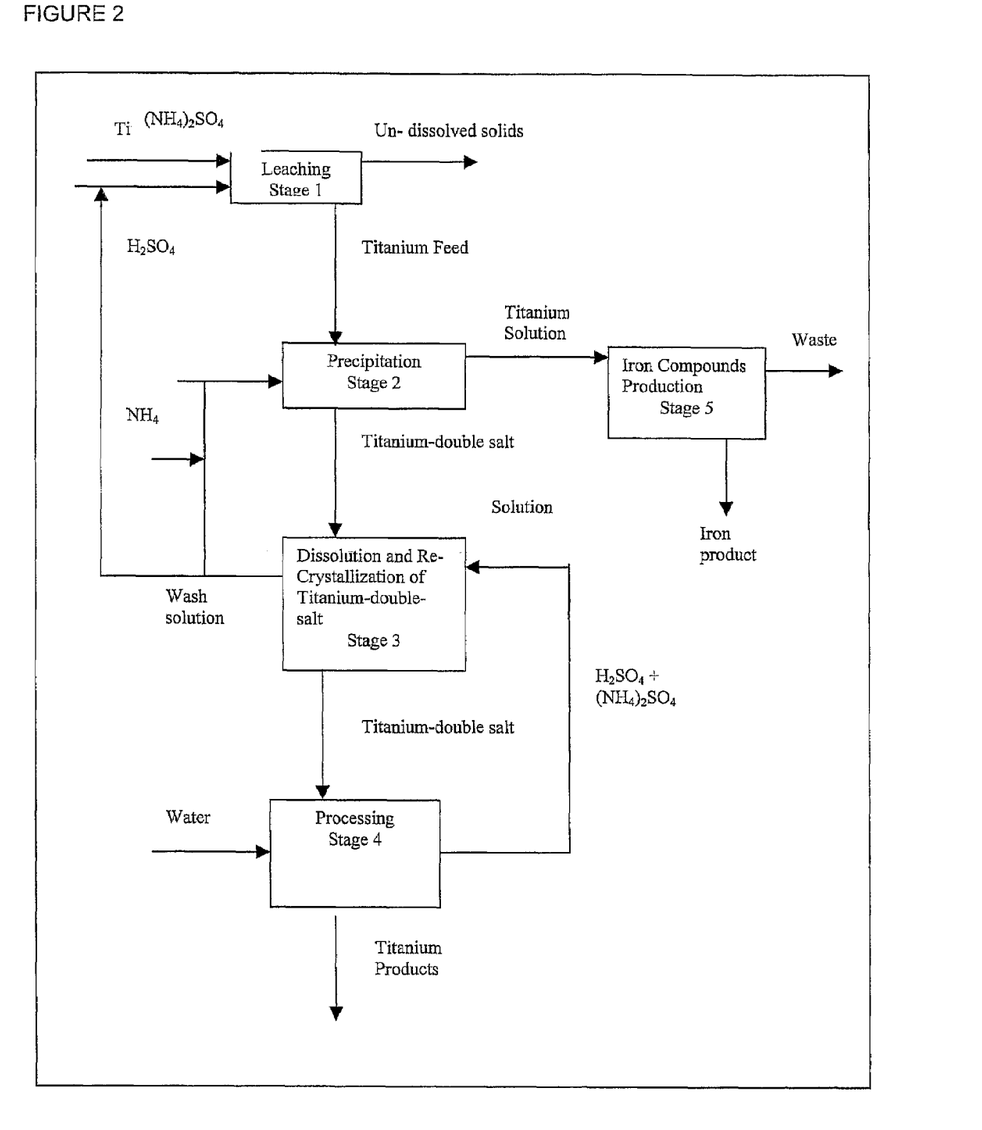

FIG. 2 presents a flow diagram of one of the preferred processes according to the embodiments of the present invention. This figure is very similar to FIG. 1, however, instead of a Washing stage of the titanium-double salt (Stage 3) this figure presents Dissolution and Re-Crystallization steps for the final purification of the titanium-double-salt.

Figure 3:
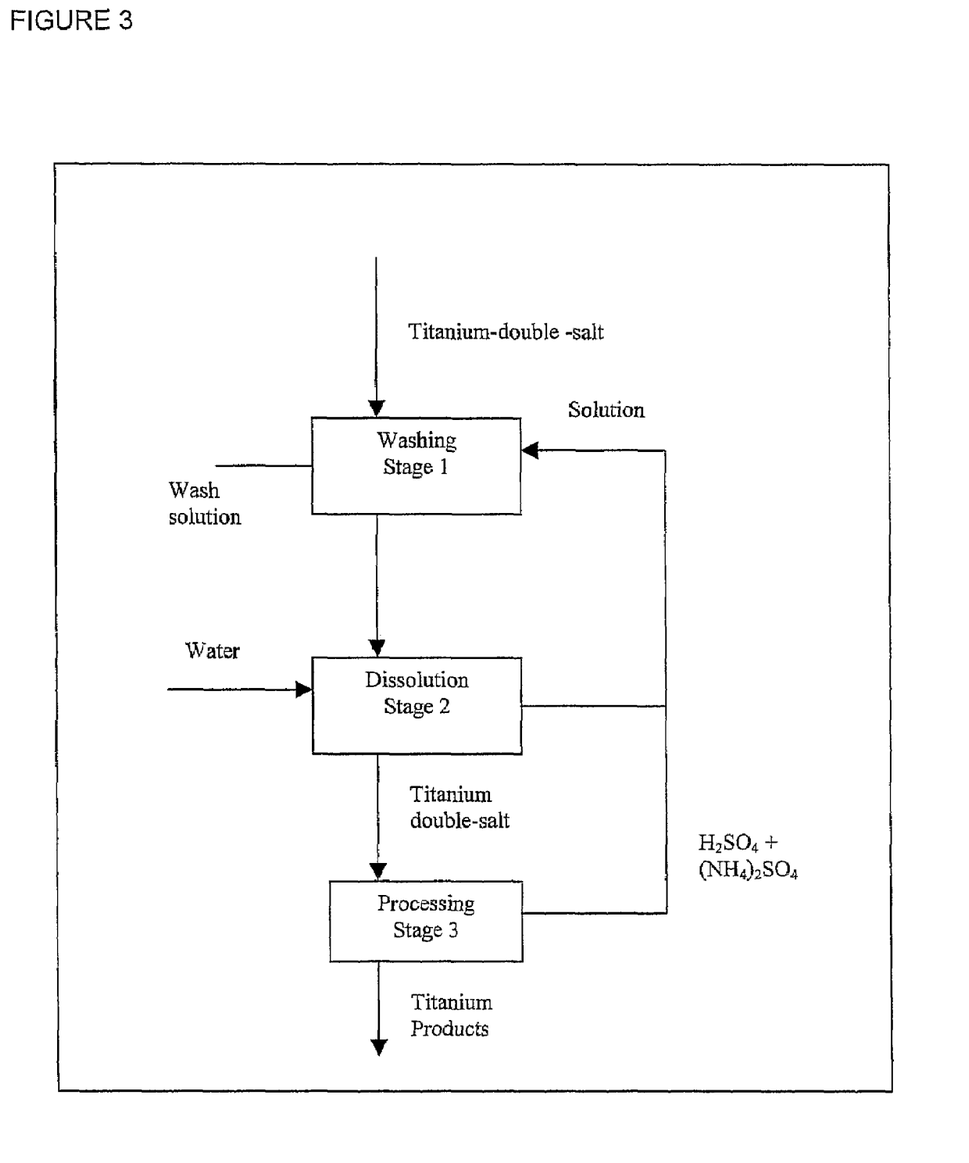

FIG. 3 presents a flow diagram of one of the preferred processes according to the present invention for a method of the production of a titanium metal from titanium double-salt solution, comprising the steps of dissolution of a titanium double-salt in solution and inducing the conditions to distill titanium chloride from said solution.

According to a preferred embodiment of the process, the anion titanium double salt is chloride and the titanium chloride is distilled out from the salt as is or after the addition of water or/and solvent.

According to another preferred embodiment of the process the anion titanium double salt is sulfate and the titanium chloride or titanyl chloride are produced by the addition of chloride salt or HCl and water and/or solvent.

According to another preferred embodiment of the process the titanium double salt is reduced by the Kroll process to produce elementary titanium.

Stage 1 presents dissolution of a titanium double-salt in an aqueous solution. For simplification this stream in this figure was noted to be water.

DESCRIPTION OF PREFERRED EMBODIMENTS

COMPARATIVE EXAMPLE 1

Various amounts of solutions obtained by leaching limenite with sulfuric acid, various amounts of ammonia and of $(NH_4).SO_4$ were added into flasks. The flasks were shaken at 25° C. for 20 min or 1.5 hours. A precipitate was formed. The composition of the leachate limenite solution is presented in Table 1 and that of the precipitate and titanium solution in Tables 2 and 3.

TABLE 1

| $Ti(SO_4)_2$ Wt % | $Fe_2(SO_4)_3$ Wt % | $FeSO_4$ Wt % |
|---|---|---|
| 11.0 | 2.0 | 8.17 |

TABLE 2

| | | Results after 1.5 hours at RT | | | | |
|---|---|---|---|---|---|---|
| No. | $(NH_4)_2SO_4$ Wt % | $(NH_4)_2SO_4$ Final Wt % | $Ti(SO_4)_2$ in solution Wt % | $Fe^{+3}{}_2(SO_4)_3$ in solution Wt % | $Fe^{+2}SO_4$ in solution Wt % | $Fe^{+2}/Ti$ in crystals mole/mole |
| 1 | 24 | 9.59 | 1.3 | 2.5 | 2.76 | 0.88 |
| 2 | 21 | 6.01 | 2.2 | 2.3 | 4.80 | 0.60 |
| 3 | 17 | 4.73 | 3.7 | 2.6 | 7.92 | 0.05 |

TABLE 3

Results after 20 min

| No. | $(NH_4)_2SO_4$ Wt % | $(NH)_2SO_4$ Final Wt % | $Ti(SO_4)_2$ in solution Wt % | $Fe^{+3}{}_2(SO_4)_3$ in solution Wt % | $Fe^{+2}SO_4$ in solution Wt % | $Fe^{+2}/Ti$ mole/mole |
|---|---|---|---|---|---|---|
| 4 | 20 | 4.73 | 1.9 | 2.3 | 3.37 | 0.83 |
| 5 | 24 | 8.34 | 1.0 | 2.7 | 2.11 | 0.96 |
| 6 | 28 | 13.14 | 0.8 | 2.4 | 0.98 | 1.1 |

The example teaches us that Fe cations and titanium cations co-precipitate as double salts at low residual titanium and Fe concentrations or low residual ammonium sulfate concentrations to form un-pure double salt

EXAMPLE 2

Various amount of solutions obtained by leaching limenite with sulfuric acid, ammonia and $(NH_4)_2SO_4$ were added into flasks. The flasks were shaken at 25° C. for 1.5 hours. A precipitate was formed. The composition of the precipitate and solution is presented in Table 4

TABLE 4

Results after 1.5 hours at RT

| No. | $(NH_4)_2SO_4$ Wt % | $(NH_4)_2SO_4$ Final Wt % | $Ti(SO_4)_2$ in solution Wt % | $Fe^{+3}{}_2(SO_4)_3$ in solution Wt % | $Fe^{+2}SO_4$ in solution Wt % | $Fe^{+2}/Ti$ in crystals mole/mole |
|---|---|---|---|---|---|---|
| 3 | 17 | 4.73 | 3.7 | 2.6 | 7.92 | 0.05 |

The example teaches us that precipitation of titanium salt of high purity can be obtained even from solution in which the residual Fe concentration is much higher than that of the Ti

EXAMPLE 3

Various amount of solutions obtained by leaching limenite with sulfuric acid, ammonia and $(NH_4)_2SO_4$ were added into flasks. The flasks were shaken at 25° C. for 1.5 hours. A precipitate was formed. The composition of the precipitate and solution is presented in Table 5.

TABLE 5

| | Initial | | Final | | | | |
|---|---|---|---|---|---|---|---|
| No. | $Ti(SO_4)_2$ in solution Wt % | $(NH_4)_2SO_4$ Wt % | $(NH_4)_2SO_4$ Final calculated Wt % | Ti Wt % | $Fe_2(SO_4)_3$ Wt % | FeSO Wt % | $Fe^{+2}/Ti$ in crystals Mole/mole |
| 7 | 20.5 | 23 | 16 | 1.5 | 3.8 | 1.7 | 0.41 |
| 8 | 20.5 | 19 | 12 | 2.7 | 4.0 | 5.8 | 0.09 |
| 9 | 20.5 | 13 | 7.3 | 9.0 | 4.3 | 7.0 | 0.00 |
| 10 | 20.5 | 16 | 8.8 | 3.9 | 3.9 | 6.7 | 0.02 |

The example teaches us that ratio between residual ammonia to residual sulfate has dramatic effect on the purity of the double salt.

EXAMPLE 4

Various amount of solutions obtained by leaching limenite with sulfuric acid, and $(NH_4)_2SO_4$ were added into flasks. The flasks were shaken at 30° C. for 20 min. A precipitate was formed. The composition of the initial solution is presented in Table 6 and that of the results in table 7

TABLE 6

Initial conditions

Concentration in leaching solutions

| No. | $(NH_4)_2SO_4$ Wt % | $Ti(SO_4)_2$ Wt % | $Fe_2(SO_4)_3$ Wt % | $FeSO_4$ Wt % |
|---|---|---|---|---|
| 1 | 14.8 | 6.5 | 5.3 | 6.3 |
| 2 | 14.4 | 12.1 | 5.1 | 6.1 |
| 3 | 14.4 | 18.1 | 4.9 | 5.9 |

TABLE 7

| (NH$_4$)$_2$SO$_4$ in solution (added) Wt % | Ti(SO$_4$)$_2$ in solution Wt % | Fe$_2$(SO$_4$)$_3$ in solution Wt % | FeSO$_4$ in solution Wt % | Fe$^{+2}$/Ti in crystals mole/mole |
|---|---|---|---|---|
| 13 | 6.7 | 6.2 | 6.01 | 0.00 |
| 10 | 5.1 | 6.0 | 5.62 | 0.02 |

The example teaches us that at the right residual NH$_4$/SO$_4$ ratio, the precipitate is practically free of Fe even at very high Fe/Ti ratio in solution

EXAMPLE 5.1

Various amount of solutions obtained by leaching limenite with sulfuric acid, ammonia and (NH$_4$)$_2$SO$_4$ were added into flasks. The flasks were shaken at 25° C. for 1.5 hours. A precipitate was formed. The composition of the precipitate and solution is presented in Table 8

TABLE 8

| | Initial | | Final (calculated for initial solution) | | | | |
|---|---|---|---|---|---|---|---|
| No. | Ti(SO$_4$)$_2$ in solution Wt % | (NH$_4$)$_2$SO$_4$ Wt % | (NH$_4$)$_2$SO$_4$ Final Wt % | Ti Wt % | Fe$_2$(SO$_4$)$_3$ Wt % | FeSO$_4$ Wt % | Fe$^{+2}$/Ti in crystals alculated Mole/mole |
| 1 | 20.5 | 23 | 16 | 1.5 | 3.8 | 1.7 | 0.41 |
| 2 | 20.5 | 22 | 13 | 2.5 | 4.0 | 5.4 | 0.19 |

EXAMPLE 5.2

The crystal obtained in Vial No 2 and 20% NH$_4$HSO$_4$ solution were added into a vial. The vial was shaken for 20 min at 30° C. The composition of the solid is presented in Table 9

TABLE 9

| | Initial | | | Final in solid | | |
|---|---|---|---|---|---|---|
| No. | Ti(SO$_4$)$_2$ in solution Wt % | NH$_4$HSO$_4$ in solution Wt % | Fe(II)/Ti Wt % | Fe$_2$(SO$_4$)$_3$ Wt % | FeSO$_4$ Wt % | Fe$^{+2}$/Ti in crystals calculated Mole/mole |
| 1 | 20.5 | 20 | 0.41 | ~0 | 0.01 | 0 |
| 2 | 20.5 | 20 | 0.19 | ~0 | 0.03 | 0.02 |

EXAMPLE 5.3

2.0 gr double salt obtained in Example 5.2 were dissolved in 10 gr water. The solution was heated to 169° C. A precipitate was formed. The concentration of Ti in the remaining solution was about 0.05%

EXAMPLE 6

2.0 gr double salt obtained in Example 5.1 were dissolved in 2 gr water. 0.2M NaOH solution was added slowly to pH of 4.2. A precipitate was formed. The precipitate was separated and washed and found to be titanic acid.

4N HCl solution was added to the solution to form titanyl chloride solution

EXAMPLE 7

2.0 gr double salt obtained in Example 5.2 were dissolved in 2 gr water. 0.2M NaOH solution was added slowly to pH of 4.2. A precipitate was formed. The precipitate was separated and washed and found to be titanic acid.

4N H$_2$SO$_4$ solution was added to the solution to form titanyl sulfate solution

EXAMPLE 8

2.0 gr double salt obtained in Example 5.2 were dissolved in 2 gr water. 0.2M NaOH solution was added slowly to pH of 4.2. A precipitate was formed. The precipitate was separated and washed and found to be titanic acid. The precipitate is washed with propanol.

Concentrated H$_2$SO$_4$ solution was added to the solution to form titanyl sulfate solution. Mg metal is added into the solution. Titanium metal is precipitated while magnesium salt is formed

EXAMPLE 9

2.0 gr double salt obtained in Example 5.2 were dissolved in 2 gr water. 0.2M NaOH solution was added slowly to pH of 4.2. A precipitate was formed. The precipitate was separated and washed and found to be titanic acid.

Lauryl sulfonate solution was added to the solution to form an organic titanyl salt.

It will be evident to those skilled in the art that the invention is not limited to the details of the foregoing illustrative

What is claimed is:

1. A method for the industrial purification of a titanium feed stream of purity P1, by the formation of a titanium-double-salt precipitate of purity P2 and a titanium solution with purity P3, wherein P2>P1>P3, said method comprising the steps of:
   i. forming, from said feed, a medium comprising water, titanium ion, a cation selected from the group consisting of ammonium, cations of alkali metals, protons and a combination thereof, and an anion selected from the group consisting of OH, $SO_4$, $HSO_4$ and a combination thereof, which formed medium is further characterized by the presence of
      (a) a double-salt precipitate comprising titanium ion, at least one of said cations and at least one of said anions; and
      (b) a titanium solution; and wherein the concentration of said anion in said titanium solution is higher than 15 wt % and the ratio between the concentrations of said cation and said anion in said titanium solution is higher than 0.4 and lower than 1.6; and
   ii. separating a least a portion of said precipitate from said solution.

2. A method according to claim 1, further comprising the step of processing said precipitate to produce titanium oxide.

3. A method according to claim 2, wherein said titanium oxide contains at least 70% of the titanium originally present in said feed stream.

4. A method according to claim 2, wherein said titanium oxide comprises nano-particles in mid size range of 5-100 nanometer.

5. A method according to claim 2, wherein said titanium oxide comprises nano-particles in mid size range of 100-300 nanometer.

6. A method according to claim 2, for the production of a titanium oxide from said titanium double-salt, comprising the steps of:
   a. dissolution of a titanium double-salt in aqueous solution; and
   b. inducing precipitation of titanium oxide from said solution by an action selected from the group consisting of dilution, temperature elevation, increasing pH and a combination thereof.

7. A method according to claim 6, wherein said titanium oxide contains at least 80% of the titanium originally present in said double salt.

8. A method according to claim 6, wherein said temperature elevation involves increasing the temperature to above 80° C.

9. A method according to claim 6, wherein said temperature elevation refers to increasing the temperature to be in the range of 120° C. to 250° C.

10. A method according to claim 2, wherein said titanium oxide contains at least 70% of the titanium that was present in said titanium feed stream solution.

11. A method according to claim 1, further comprising the step of processing said precipitate to produce a titanium product other than titanium oxide.

12. A method according to claim 1, further comprising the step of processing said precipitate to produce titanium metal.

13. A method according to claim 1, wherein said titanium feed stream is an aqueous waste solution.

14. A method according to claim 1, wherein said titanium feed stream comprises at least 2 wt % iron cations.

15. A method according to claim 1, wherein said titanium feed is formed by leaching titanium ores with an acid solution.

16. A method according to claim 1, wherein P1 is in the range of between about 10% and about 90%.

17. A method according to claim 1, wherein P1 is lower than 60%.

18. A method according to claim 1, wherein P1 is lower than 50%.

19. A method according to claim 1, wherein the titanium feed stream comprises iron with a Fe/Ti molar ratio of at least 0.25 and wherein said ratio in said titanium double salt precipitate is less than 0.02.

20. A method according to claim 1, where P1 is less than 70% and P2 is greater than 95%.

21. A method according to claim 1, wherein said titanium feed stream comprises protons and at least one anion selected from the group consisting of sulfate, bisulfate and a combination thereof.

22. A method according to claim 1, wherein said titanium feed stream comprises a byproduct stream from an industrial process.

23. A method according to claim 1, wherein said titanium feed stream comprises iron and wherein the Fe/Ti molar ratio in said feed stream is in a range between about 0.2:1 and about 3:1.

24. A method according to claim 23, wherein the Fe/Ti molar ratio in said double salt precipitate is smaller than that ratio in said feed stream by a factor of at least 5.

25. A method according to claim 1, wherein said cation in said double-salt is ammonium.

26. A method according to claim 1, wherein the cation in said double-salt is selected from the group consisting of sodium and potassium.

27. A method according to claim 1, wherein the anion in said double-salt is selected from the group consisting of OH, $SO_4$, $HSO_4$ and halides.

28. A. method according to claim 1, wherein said precipitate is selected from the group consisting of titanium double salts and titanium basic double salts.

29. A method according to claim 1, wherein said precipitate contains at least 80% of the titanium originally present in said feed stream.

30. A method according to claim 1, wherein the ratio P2/P3 is greater than 2.

31. A method according to claim 1, wherein the ratio P2/P3 is greater than 10.

32. A method according to claim 1, wherein the temperature of said formed medium is in the range between 0-80° C.

33. A method according to claim 1, wherein the temperature of said formed medium is in the range between 10-50° C.

34. A method according to claim 1, wherein the temperature of said formed medium is in the range between 20-40° C.

35. A method according to claim 1, further comprising a step of processing said titanium solution to form a product selected from the group consisting of iron metal, an iron oxides, other iron product, products of other polyvalent cations present in said titanium feed solution and their combinations, which processing comprises crystallization.

36. A method according to claim 35, wherein said iron product is selected from the group consisting of a iron double salt, iron oxide and iron hydroxide.

37. A method according to claim 36, wherein the anion of said iron double salt is selected from the group consisting of monovalent anions, divalent anions, halide anions, sulfate and bisulfate anions and a combination thereof.

38. A method according to claim 36, wherein said iron double salt comprises a cation selected from the group consisting of ammonium, sodium and potassium.

39. A method according to claim 35 wherein said compound of polyvalent cation is selected from the group consisting of neutral double salts, basic double salt, oxides, hydroxide and a combination thereof.

40. A method according to claim 1 further comprising the step of washing said separated precipitate to form washed precipitate with a purity of P4 and a wash solution with a purity of P5, wherein P4>P2>P5.

41. A method according to claim 40, wherein said washing is with a solution comprising at least one cation and at least one anion selected from said groups of claim 1, and wherein the concentration of said anion is higher than 15 wt % and the ratio between the concentrations of said cation and said anion in said titanium solution is higher than 0.2 and lower than 1.6.

42. A method according to claim 40, wherein said washing is with a solution comprising protons, ammonium and sulfate ions.

43. A method according to claim 1, further comprising the step of re-crystallizing said precipitate, optionally pre-washed, to form a precipitate with a purity of P6 and a mother liquor with a purity P7, wherein P6>P2>P7.

44. A method according to claim 43 wherein said re-crystallization uses a solution comprising at least one cation and at least one anion selected from said groups of claim 1.

45. A method according to claim 43, wherein said re-crystallization is induced by an action selected from the group consisting of adding a salt of a monovalent-cation, adding a base of a monovalent-cation, increasing temperature, dilution and a combination thereof.

46. A method according to claim 1, further comprising the steps of:
   a. dissolution of a titanium double-salt in aqueous solution; and
   b. inducing a change of the conditions to form a titanium oxide precipitation from said solution, wherein said change is selected from the group consisting of dilution, temperature elevation, increasing pH and a combination thereof.

47. A method according to claim 1, wherein P2 is greater than 80%.

48. A method according to claim 1, wherein P2 is greater than 85%.

49. A method according to claim 1, wherein P2 is greater than 95%.

* * * * *